(12) United States Patent
Carter et al.

(10) Patent No.: US 11,015,440 B2
(45) Date of Patent: May 25, 2021

(54) STABILIZER WITH FIN-MOUNTED ELECTRODE FOR PROVIDING SIGNALS TO DRILL STRING ANTENNA

(71) Applicant: Halliburton Energy Services, Inc., Houston, TX (US)

(72) Inventors: Daniel Patrick Carter, Conroe, TX (US); Brian Allen Mohon, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 124 days.

(21) Appl. No.: 15/556,433

(22) PCT Filed: Apr. 16, 2015

(86) PCT No.: PCT/US2015/026230
§ 371 (c)(1),
(2) Date: Sep. 7, 2017

(87) PCT Pub. No.: WO2016/167781
PCT Pub. Date: Oct. 20, 2016

(65) Prior Publication Data
US 2018/0106145 A1    Apr. 19, 2018

(51) Int. Cl.
*E21B 47/12*    (2012.01)
*E21B 17/10*    (2006.01)
*E21B 47/13*    (2012.01)
*G01V 11/00*    (2006.01)
*H01Q 1/04*    (2006.01)
*E21B 31/18*    (2006.01)

(52) U.S. Cl.
CPC .......... *E21B 47/13* (2020.05); *E21B 17/1042* (2013.01); *E21B 17/1078* (2013.01); *G01V 11/002* (2013.01); *H01Q 1/04* (2013.01); *E21B 31/18* (2013.01)

(58) Field of Classification Search
CPC .............. E21B 47/122; E21B 17/1042; E21B 17/1078; E21B 31/18; G01V 11/002; H01Q 1/04
See application file for complete search history.

(56) References Cited

U.S. PATENT DOCUMENTS

| 3,028,542 | A | * | 4/1962 | Terry | .................... E21B 33/138 |
| | | | | | 324/347 |
| 4,874,045 | A | * | 10/1989 | Clayton | .................... E21B 7/04 |
| | | | | | 175/57 |
| 5,235,285 | A | | 8/1993 | Clark et al. | |

(Continued)

FOREIGN PATENT DOCUMENTS

| WO | 2014134741 A1 | 9/2014 |
| WO | 2015031973 A1 | 3/2015 |
| WO | 2016167781 A1 | 10/2016 |

*Primary Examiner* — Giovanna Wright
*Assistant Examiner* — Yanick A Akaragwe
(74) *Attorney, Agent, or Firm* — Benjamin Ford; Parker Justiss, P.C.

(57) ABSTRACT

A stabilizer apparatus for applying an electrical signal to a drill string antenna, comprising: an elongate member; and a fin extending radially from the elongate member, the fin having an angled leading face and an electrode face that opposes the elongate member, the electrode face including an electrode to apply electrical signals to a conductive member of the drill string antenna.

20 Claims, 5 Drawing Sheets

(56) References Cited

U.S. PATENT DOCUMENTS

| | | |
|---|---|---|
| 5,883,516 A | 3/1999 | Van Steenwyk et al. |
| 2005/0006090 A1 | 1/2005 | Chemali et al. |
| 2015/0285062 A1* | 10/2015 | Logan .................... E21B 47/122 |
| | | 175/40 |

* cited by examiner

STABILIZER WITH FIN-MOUNTED ELECTRODE FOR PROVIDING SIGNALS TO DRILL STRING ANTENNA

CROSS-REFERENCE TO RELATED APPLICATION

This application is the National Stage of, and therefore claims the benefit of, International Application No. PCT/US2015/026230 filed on Apr. 16, 2015, entitled "STABILIZER WITH FIN-MOUNTED ELECTRODE FOR PROVIDING SIGNALS TO DRILL STRING ANTENNA," which was published in English under International Publication Number WO 2016/167781 on Oct. 20, 2016. The above application is commonly assigned with this National Stage application and is incorporated herein by reference in its entirety.

BACKGROUND

Modern drilling techniques include the use of various measurement and logging tools to determine downhole conditions and parameters, such as the material properties of the formation within which a drilling operation is performed. Any of a variety of different telemetry techniques can be used to transmit collected data to the surface. One such technique is electromagnetic (EM) telemetry, in which an electromagnetic transmitter tool in the drill string generates low-frequency EM waves that pass through the formation and are detected and interpreted at the surface.

Although an EM tool can be built in different ways, in at least some applications, an EM tool couples to a dipole antenna that uses two conductive members of a drill string as the antenna poles. These conductive members are electrically isolated from each other by a non-conductive gap sub. In many cases, an EM tool within the drill string will provide electrical signals to a conductive bow spring which, in turn, applies the electrical signals to one of the conductive members (i.e., antenna poles). The other conductive member couples to ground. This creates a potential across the gap sub and excites the dipole antenna. In this way, the EM tool transmits logged data to the surface.

BRIEF DESCRIPTION OF THE DRAWINGS

Accordingly, there are disclosed in the drawings and in the following description a stabilizer with fin-mounted electrodes for providing signals to a drill string antenna. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

A representative example configuration of a stabilizer disclosed below has fin-mounted electrodes for providing signals to a drill string antenna. The stabilizer generally includes an elongate member that couples to a fishing neck on one end and an electromagnetic (EM) tool, such as a transmitter, on the other end. An axis (such as the axis 301 shown in FIGS. 3-6 and described below) of the stabilizer oriented along a length of the elongate member may be used as a reference throughout this disclosure. The axis may be a central axis through the elongate member, and may be (but is not required in all embodiments to be) an approximate axis of symmetry of the stabilizer and/or of the elongate member itself, or of a major portion thereof. For example, the axis may be an axis of a generally cylindrical portion of the elongate member. In a disclosed manner of use, the axis may generally align with the borehole or tubular string (e.g., a drill string) in the borehole through which the stabilizer is moved (e.g., lowered and/or raised within the borehole).

The axis of the stabilizer may be used as reference geometry for certain disclosed features. For example, multiple fins of the stabilizer may extend radially from the elongate member, and more particularly radially with respect to the axis of the stabilizer. This radially-extending orientation of the multiple fins may be generally orthogonal to the axis of the elongate body. Alternatively, each fin may at least include a radially-extending component, and optionally an axially-extending orientation (i.e., parallel with the axis of the stabilizer).

Each of the fins in a disclosed example embodiment has multiple faces, including an angled leading face and an electrode face. The angled leading face is angled to facilitate fluid flow through the drill string and to protect the fin from inadvertent coupling to other devices within the drill string when the EM tool is being fished out of the drill string. The angled leading face may be positioned uphole relative to the EM tool (e.g., closer to the fishing neck). The electrode face opposes the elongate member and thus lies on a plane that is relatively parallel to the elongate member. When positioned within the drill string, a force exerted by a cantilever beam spring within each fin, in tandem with a force exerted by the rubber material present in the fin, firmly presses an electrode on the electrode face against the inner diameter of the drill string. In this way, the electrode electrically couples to the drill string inner diameter to facilitate EM communications. The combined contact force exerted by the cantilever beam spring and the rubber material is sufficient to ensure that the electrodes are firmly pressed against the drill string inner diameter. As a result, the electrodes are minimally exposed (if at all) to fluid within the drill string, thereby inhibiting fluid-precipitated electrode erosion. In addition to facilitating EM communications, the stabilizer and its fins mechanically support the EM tool within the drill string, thus inhibiting damaging lateral tool displacements during drilling.

Figure 1:
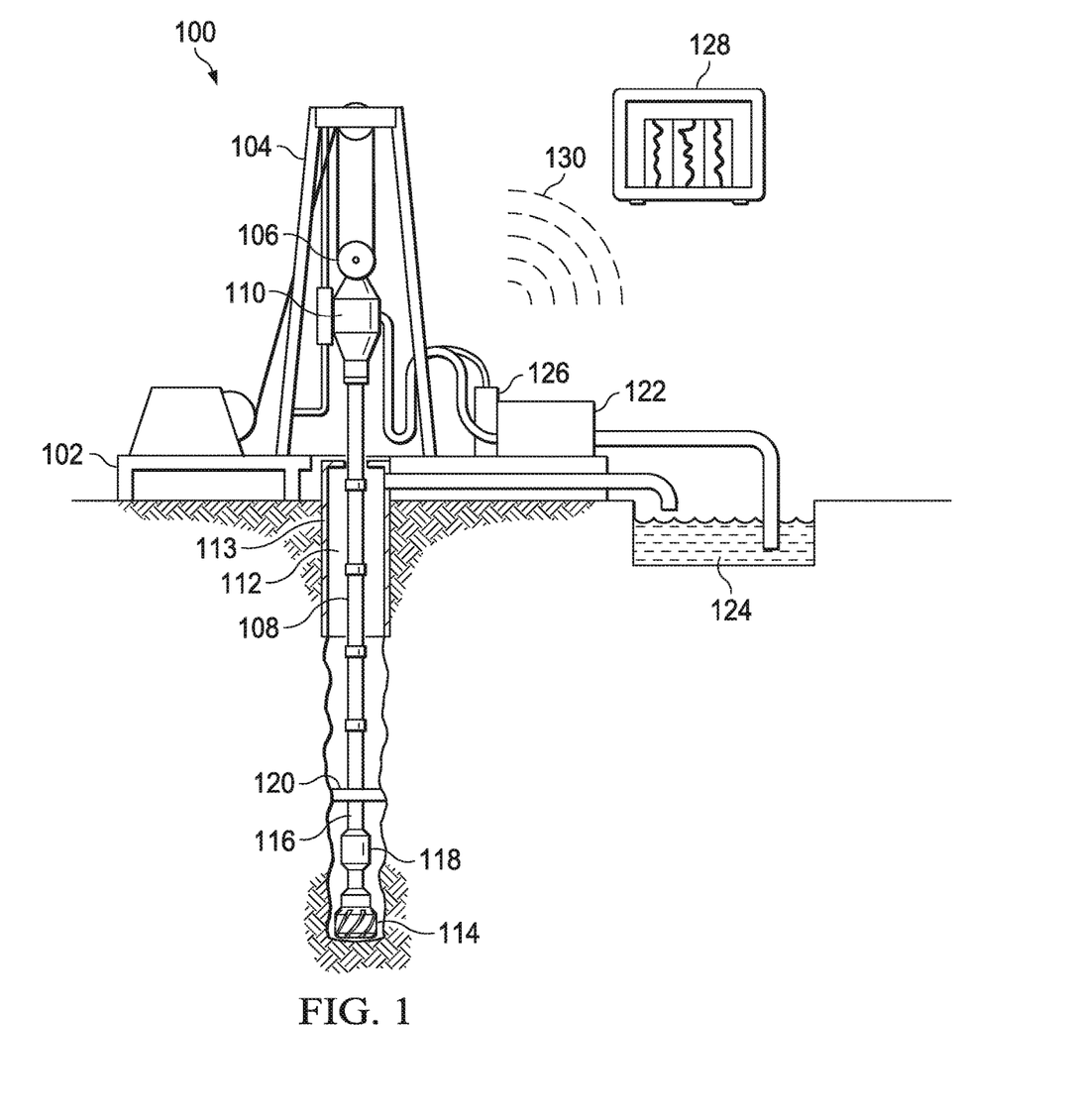
FIG. 1 is a schematic diagram of an illustrative drilling environment.

FIG. 1 is a schematic diagram of an illustrative drilling environment 100. The drilling environment 100 comprises a drilling platform 102 that supports a derrick 104 having a traveling block 106 for raising and lowering a drill string 108. A top-drive motor 110 supports and turns the drill string 108 as it is lowered into a borehole 112. The drill string's rotation, alone or in combination with the operation of a downhole motor, drives the drill bit 114 to extend the borehole 112. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 108, through orifices in the drill bit 114, back to the surface via an annulus around the drill string 108, and into a retention pit 124. The drilling fluid transports formation samples—i.e., drill cuttings—from the borehole 112 into the retention pit 124 and aids in maintaining the integrity of the borehole. Formation samples may be extracted from the drilling fluid at any suitable time and location, such as from the retention pit 124. The formation samples may then be analyzed at a suitable surface-level laboratory or other facility (not specifically shown). While drilling, an upper portion of the borehole 112 may be stabilized with a casing string 113 while a lower portion of the borehole 112 remains open (uncased).

The drill collars in the BHA 116 are typically thick-walled steel pipe sections that provide weight and rigidity for the drilling process. The thick walls are convenient sites for installing logging instruments that measure downhole conditions, various drilling parameters, and characteristics of the formations penetrated by the borehole. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors, in accordance with commands received from the surface, and provides a stream of telemetry data to the surface as needed to communicate relevant measurements and status information. A corresponding telemetry receiver and transmitter is located on or near the drilling platform 102 to complete the telemetry link. One type of telemetry link is based on electromagnetic (EM) transmissions, in which two conductive members of the drill string (e.g., drill collars in the BHA 116) are electrically isolated from each other using a gap sub (shown in FIG. 2 and described below). These conductive members act as poles in a dipole antenna when electrical signals encoded with data are applied to one of the members and the other member is coupled to ground, thereby creating a potential across the gap sub, exciting the dipole antenna and transmitting data using EM waves to the surface. At least some of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. The surface interface 126 may include, for instance, a receiver antenna (not specifically shown) to receive communications from the drill string dipole antenna. A data processing unit (shown in FIG. 1 as a tablet computer 128) communicates with the surface interface 126 via a wired or wireless link 130, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation. The data processing unit may also contain storage to store, e.g., data received from tools in the BHA 116 via mud pulse telemetry, EM telemetry, or any other suitable communication technique. The scope of disclosure is not limited to these particular examples of data processing units.

Figures 2, 3:
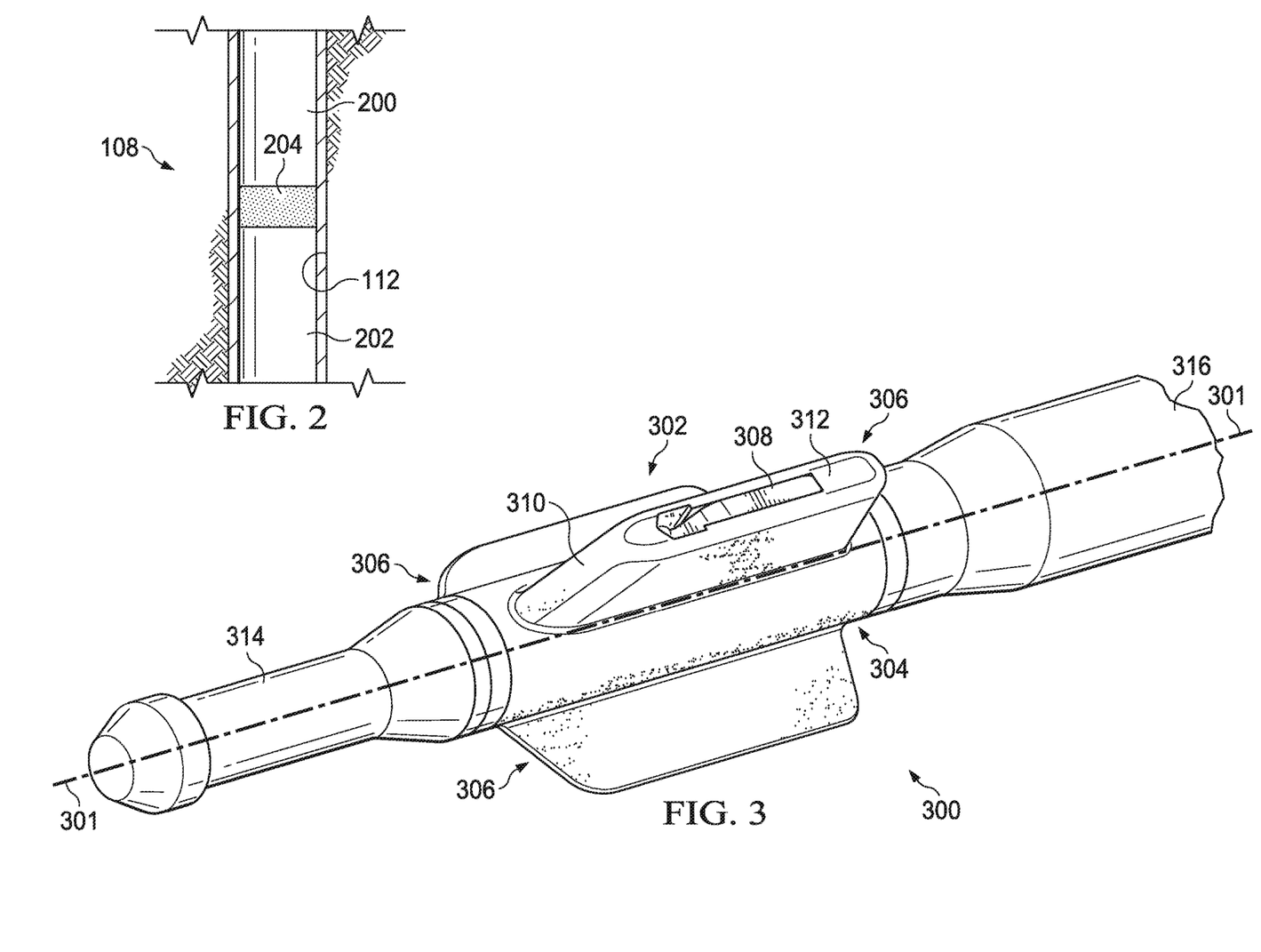
FIG. 2 is a schematic diagram of drill string conductive members separated by a gap sub to form a dipole antenna.
FIG. 3 is a perspective view of an electromagnetic (EM) tool assembly that includes an illustrative stabilizer with a fin-mounted electrode.

FIG. 2 is a schematic diagram of drill string conductive members separated by a gap sub to form a dipole antenna. Specifically, FIG. 2 shows the drill string 108 (e.g., the BHA 116 of the drill string 108) positioned inside the borehole 112. The drill string 108 includes multiple conductive members 200, 202. Each of these conductive members is, for example, a separate collar in the BHA 116. The drill string 108 further comprises a non-conductive gap sub 204 that electrically isolates the conductive members 200, 202 from each other. In this way, the portion of the drill string 108 shown in FIG. 2 forms a dipole antenna. Signals encoding data—for example, logging data collected while drilling—may be applied to either of the conductive members 200, 202 (i.e., the antenna poles) to transmit signals using the dipole antenna. The conductive members 200, 202 may be of any suitable length and diameter and may contain or otherwise couple to any suitable downhole equipment (e.g., logging tools), as long as they render acceptable performance as the poles of a dipole antenna. The stabilizer apparatus described below may be used in conjunction with the illustrative dipole antenna configuration shown in FIG. 2, or it may be used with any other suitable antenna configuration that requires the application of a signal to a drill string member to generate a potential relative to ground. Thus, although this disclosure describes the various embodiments in relation to a dipole antenna, the scope of disclosure is not limited to any particular type of antenna.

FIG. 3 provides a perspective view of an EM tool assembly 300 that may be used to apply encoded signals to a dipole antenna. The assembly 300 includes an illustrative stabilizer 302 with an elongate member 304 that is preferably cylindrical in shape. The elongate member may be of any suitable length and diameter, but in at least some embodiments, the elongate member has a length ranging between approximately 0.1 and 1.5 meters and an outer diameter ranging between approximately 10 and 100 centimeters. In at least some embodiments, the elongate member 304 comprises rubber. Other shapes, sizes and materials for the elongate member 304 are contemplated and included within the scope of this disclosure.

As alluded above, an axis 301 is oriented along a length of the elongate member 304. The axis 301 may be a central axis through the elongate member 304, and may be (but is not required in all embodiments to be) an approximate axis of symmetry of the stabilizer 302 and/or of the elongate member 304 itself, or of a major portion thereof. For example, the axis 301 may be an axis of a generally cylindrical portion of the elongate member 304. In a disclosed manner of use, the axis 301 may generally align with the borehole (e.g., the borehole 112 of FIG. 1) or tubular string (e.g., the drill string 108 of FIG. 1) in the borehole through which the stabilizer 302 is moved (e.g., lowered and/or raised within the borehole).

The stabilizer 302 also includes multiple fins 306 that extend radially from the elongate member 304, and, more particularly, that extend radially from the axis 301. In some embodiments, this radially-extending orientation of the multiple fins 306 may be generally orthogonal to the axis 301. In some embodiments, each fin 306 may include a radially-extending component, and optionally an axially-extending orientation (i.e., parallel with the axis 301). The stabilizer 302 preferably includes three fins 306, although any suitable number of fins may be used, so long as the EM tool assembly 300 receives adequate mechanical support within the drill string 108 to inhibit damaging lateral displacements and to center the tool assembly 300 within the drill string. Each of the fins 306 is at least partially made of the same rubber material as the elongate member 304 and comprises multiple faces, including an angled leading face 310 and an electrode face 312. In some embodiments, the angled leading face 310 is positioned uphole relative to the electrode face 312, meaning that the face 310 is closer to the surface than the face 312. The angled leading face 310 slopes downward so as to facilitate fluid flow in a downhole direction. In embodiments where fluid within the drill string flows in the opposite direction—that is, from the drill bit toward the surface—the angled leading face 310 may be positioned on the opposite end of the fin 306, thereby facilitating fluid flow in an uphole direction. In some embodiments, a design may be used in which both ends of the fin 306 are angled, thereby enabling enhanced fluid flow no matter the direction of the flow within the drill string. The dimensions of the angled leading face 310, including the angle of the face relative to the elongate member 304, may be chosen as desired and suitable. In at least some embodiments, however, the length of the angled leading face 310 is in the approximate range of 12 to 24 centimeters, the width of the face is in the approximate range of 4 to 8 centimeters, and the angle of the face is in the approximate range of 20 to 60 degrees relative to the elongate member 304. The height of each fin as measured from the elongate member 304 may be in the approximate range of 6 to 18 centimeters, although this height may vary.

As mentioned, each fin 306 also includes an electrode face 312 positioned opposite the elongate member 304 (e.g., substantially parallel to the elongate member 304, and, more particularly, substantially parallel to the axis 301, within a range of plus or minus 5 degrees). The electrode face 312 has any suitable length and width, but in at least some embodiments, the length of the electrode face 312 is in the approximate range of 24 to 48 centimeters and the width of the electrode face 312 is in the approximate range of 4 to 8 centimeters. The electrode face 312 includes an electrode 308. The electrode 308 is composed of any suitable conductive material, such as a corrosion-resistant alloy. In at least some embodiments, the electrode 308 is flush with the electrode face 312. The dimensions of the electrode 308 may vary. In at least some embodiments, the length of the electrode 308 is less than the length of the electrode face 312 and is within the approximate range of 12 to 24 centimeters. In some embodiments, the width of the electrode 308 is less than the width of the electrode face 312 and is within the approximate range of 2 to 4 centimeters.

The faces of the fins 306, including those of the angled leading face 310 and the electrode face 312, are not necessarily flat. In some embodiments, one or more of the faces may be curved to at least some extent—for example, to facilitate fluid flow and to avoid mechanical engagement with other equipment when the EM tool assembly 300 is fished out of the drill string. Further, in some embodiments, and particularly in those embodiments where the faces are flat or at least partially flat, the edges of the faces may be rounded to facilitate fluid flow. In some embodiments, some faces may be flat with rounded edges and other faces may be curved. All such variations and combinations in face and edge shapes are contemplated and included within the scope of this disclosure.

The EM tool assembly 300 further includes a fishing neck 314 and an EM tool 316. The fishing neck 314 may be of any suitable design, so long as it permits extraction of the stabilizer 302, EM tool 316, and any other equipment coupled thereto with the use of an overshot. The fishing neck 314 couples to the stabilizer 302 using any suitable means, such as a male and female threading system. The EM tool 316 is any suitable type of EM tool that includes a transmitter and that further includes, or at least couples to and receives data from, a logging tool or other device having data that requires transmission to the surface. In some embodiments, however, the EM tool 316 may be adapted to act as a receiver. The EM tool 316, like the fishing neck 314, couples to the stabilizer 302 using any suitable means.

Figure 4:
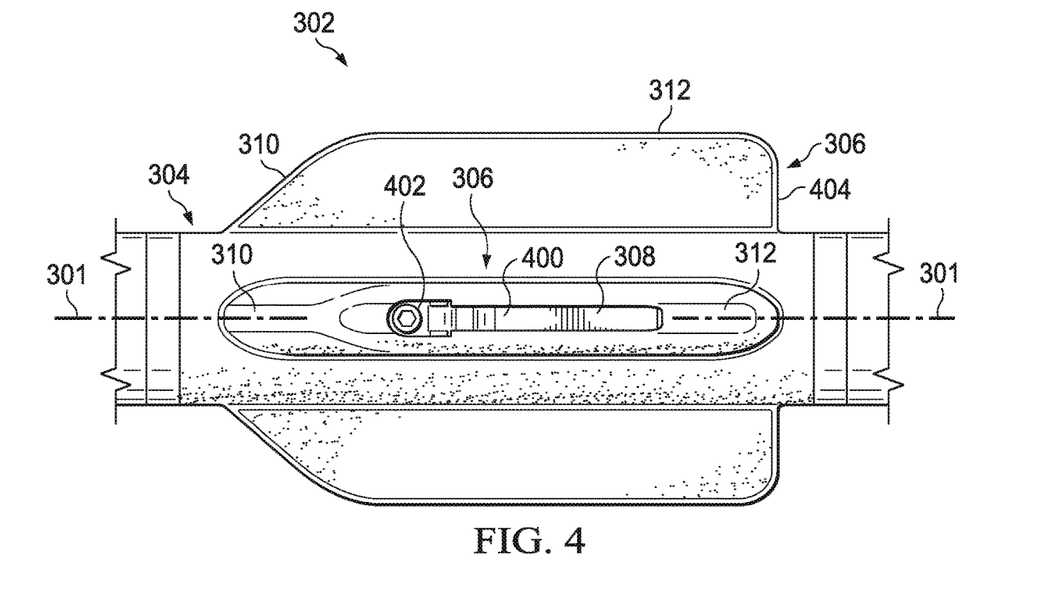
FIG. 4 is a side view of an illustrative stabilizer with a fin-mounted electrode.

FIG. 4 is a side view of the stabilizer 302 comprising the elongate member 304 and multiple fins 306. In some embodiments, and as shown in FIG. 4 and discussed above, the angled leading faces 310 are angled to enhance hydrodynamics. For at least the same reason, the various edges shown in FIG. 4 (e.g., the intersection between angled leading faces 310 and electrode faces 312) are rounded. Such rounding may also discourage inadvertent mechanical coupling (i.e., "getting stuck") to other objects in the drill string when the EM tool assembly 300 is fished out of the drill string. Although the faces 404 are not shown as being angled, as explained above, in some embodiments these faces may also be angled to facilitate fluid flow. The electrode faces 312 include electrodes 308. As now described in greater detail with respect to FIG. 5, each electrode 308 couples to a conductive fastener 402 by way of a conductive cantilever beam spring 400.

Figure 5:
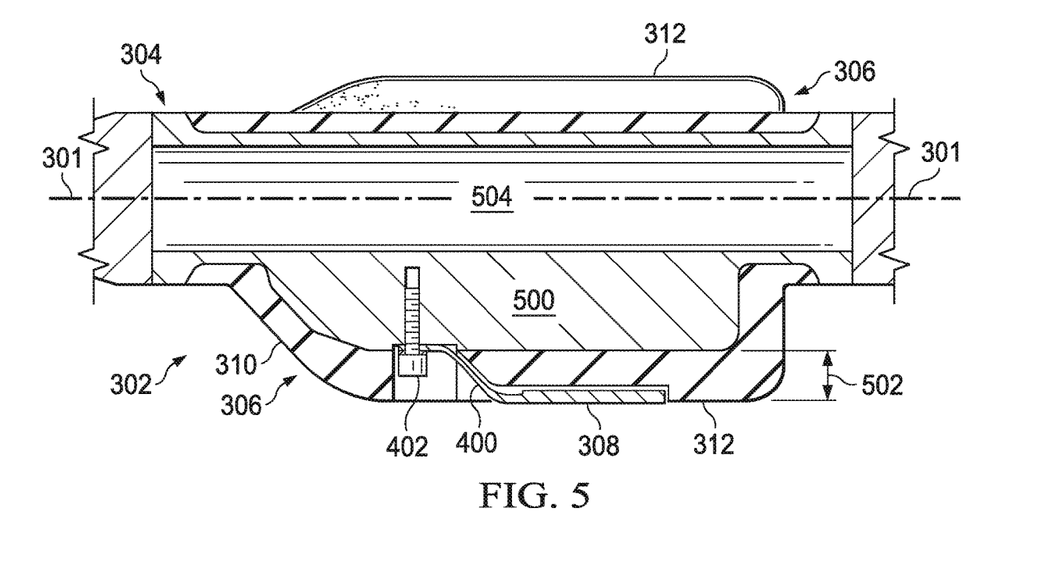
FIG. 5 is a cross-sectional view of an illustrative stabilizer with a fin-mounted electrode.

FIG. 5 is a cross-sectional view of the stabilizer 302. As FIG. 5 shows, the elongate member 304 contains at least part of a metal insert 500 (comprising any suitable type of metal or alloy) and a hollow space 504 in which various equipment may be housed. The metal insert 500 couples to the conductive fastener 402; in turn, the conductive fastener 402 couples to the cantilever beam spring 400, which, in turn, couples to the electrode 308. The metal insert 500 couples to the EM tool 316 (shown in FIG. 3) either directly or by way of other types of conductors (not specifically shown) housed within the hollow space 504. In this way, an electrical pathway is established between the electrode 308 and the EM tool 316. Thus, signals generated by the EM tool 316 are provided to the electrode 308 for application to one of the conductive members on either side of the gap sub 204, as shown in FIG. 2. The length and diameter of the conductive fastener 402 (e.g., a bolt) are in the approximate ranges of 4 to 12 centimeters and 1 to 4 centimeters, respectively, although other dimensions may also be used. In some embodiments and as shown in FIGS. 4 and 5, the electrode 308 is flush with the electrode face 312, but the cantilever beam spring 400 and the conductive fastener 402 are recessed within the fin 306, so a portion of the electrode face 312 is also recessed, or "caved in." In other embodiments, this recessed area corresponding to the locations of the cantilever beam spring 400 and conductive fastener 402 is covered with rubber material so that there are no recessed areas on the electrode face 312.

Still referring to FIG. 5, the fin 306 includes rubber material having a thickness 502. The thickness 502 of the rubber material and the elasticity of the rubber material itself determine the amount of outward contact force applied to the electrode 308. The cantilever beam spring 400 supplements this outward contact force on the electrode 308. The total outward contact force applied to the electrode 308 causes the electrode to remain firmly pressed against the inner diameter of the drill string and further precludes, or at least mitigates, exposure of the electrode 308 to fluid within the drill string. By minimizing such fluid exposure, electrode erosion is inhibited. The spring constant of the cantilever beam spring 400, as well as the effective spring constant of the rubber material in the fin 306, may be selected as necessary to achieve these design goals. In at least some embodiments, the thickness 502 of the rubber material in the fin 306 is in the approximate range of 2 to 6 centimeters. In some embodiments, the length of the cantilever beam spring 400 is in the approximate range of 4 to 8 centimeters and the spring's width is in the approximate range of 2 to 4 centimeters. In some embodiments, a different conductive material, such as a wire, may be used in lieu of the cantilever beam spring 400. In such cases, the quality (e.g., elasticity) and thickness of the rubber material may be adjusted to compensate for the missing cantilever beam spring 400.

Figure 6:
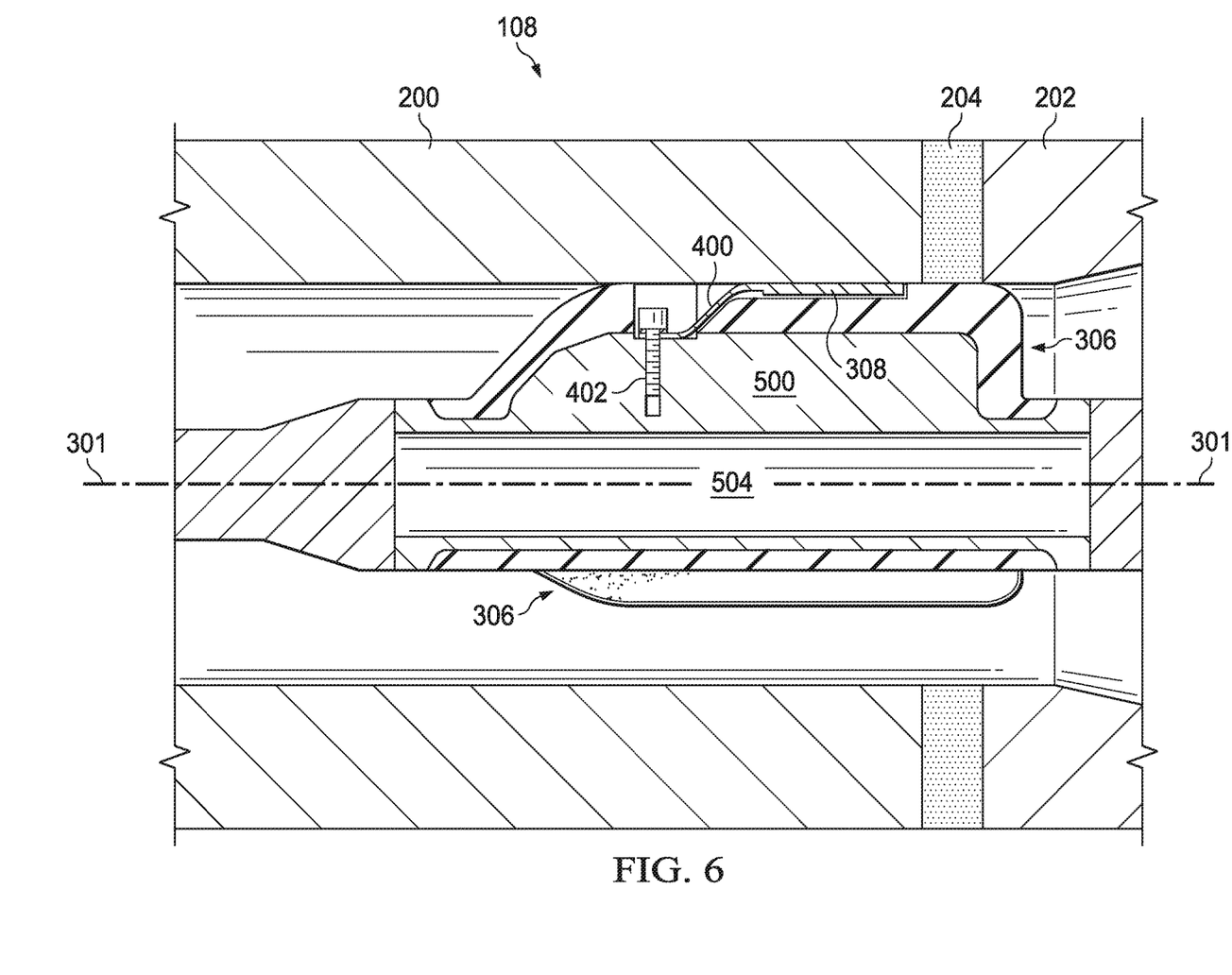
FIG. 6 is a cross-sectional view of an illustrative stabilizer with a fin-mounted electrode coupled to an antenna pole.

FIG. 6 is a cross-sectional view of the stabilizer 302 coupled to an inner diameter of the drill string 108—and, more specifically, to conductive member 200 of the dipole antenna—to facilitate EM transmissions. In some embodiments, the stabilizer 302 may couple to the conductive member 202 instead of the conductive member 200. In either case, the conductive member not coupled to the stabilizer 302 couples to ground (coupling not specifically shown). As shown, the fin 306 is firmly pressed against the drill string inner diameter so that the electrode 308 makes electrical contact with the conductive member (i.e., pole) 200. Electrical signals output by the EM tool 316 (FIG. 3) are provided to the electrode 308 via the metal insert 500 (and any other connections between the tool 316 and the metal insert 500), the conductive fastener 402, and the cantilever beam spring 400. The electrode 308 makes physical contact with the conductive member 200. Because the conductive member 200 couples to electrode 308 and member 202 couples to ground, a potential is generated across the gap sub 204. Applying modulated signals across the gap sub in this manner causes the generation of EM waves that may be used to transmit data to the surface. Because the stabilizer 302 includes multiple fins 306 and thus multiple electrodes 308, the electrodes 308 may couple to the inner diameter of the drill string (and to the conductive member 200) in multiple circumferential locations. This arrangement provides a measure of redundancy in the event that one of the fins or electrodes should fail (e.g., due to erosion). The adaptation of such an antenna configuration for receiving signals is also contemplated and included within the scope of the disclosure.

Figure 7:
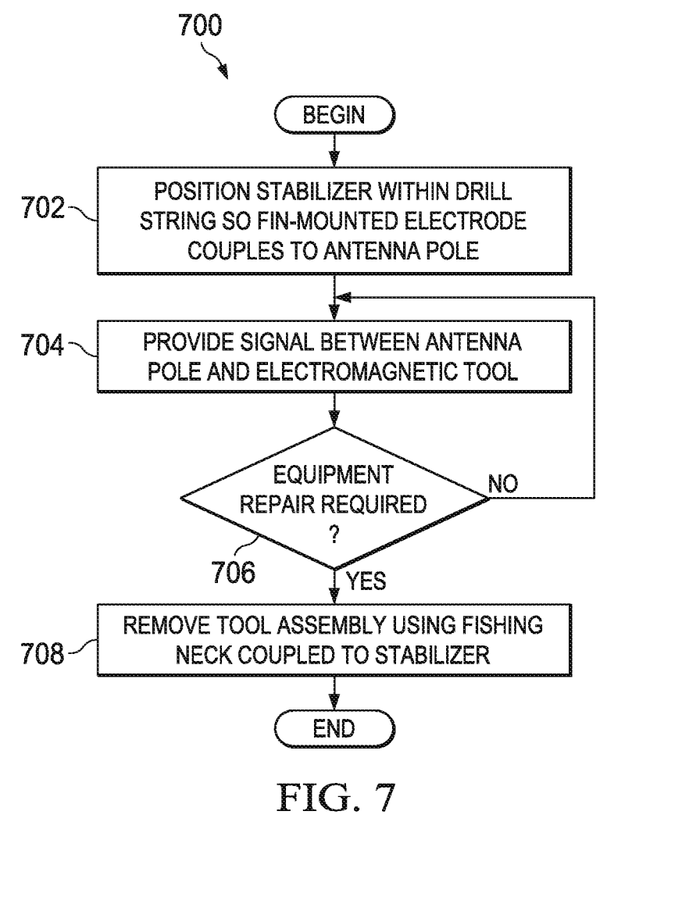
FIG. 7 is a flow diagram of an illustrative method for using a stabilizer with a fin-mounted electrode to provide signals to a drill string dipole antenna.

FIG. 7 is a flow diagram of an illustrative method 700 for using the EM tool assembly 300. The method 700 begins by positioning the stabilizer within the drill string so that the fin-mounted electrode(s) couple to one of the antenna poles (step 702). A signal is provided between the EM tool and the antenna pole via the electrode(s) (step 704). If, at any point in time, it is determined that equipment repair is required downhole that would necessitate removal of the tool assembly (step 706), the assembly is removed by delivering an overshot downhole through the internal diameter of the drill string (step 708). The overshot latches onto the fishing neck and the assembly is removed by pulling it uphole. The likelihood that any portion of the stabilizer will inadvertently couple (or "get stuck") to other equipment in the drill string is reduced due to the shape of the stabilizer—that is, the stabilizer's rounded surfaces and angled fins. The process is then complete.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

At least some of the embodiments in the present disclosure are directed to a stabilizer apparatus for applying an electrical signal to a drill string antenna, comprising: an elongate member; and a fin extending radially from the elongate member, said fin having an angled leading face and an electrode face that opposes the elongate member, wherein the electrode face includes an electrode to apply electrical signals to a conductive member of the drill string antenna. Such embodiments may be supplemented in a variety of ways, including by adding any or all of the following concepts, in any sequence and in any combination: wherein the stabilizer apparatus comprises rubber; wherein the drill string antenna is a dipole antenna comprising multiple conductive members of a drill string separated by an insulating gap sub, and wherein the electrode applies said electrical signals to one of said multiple conductive members; wherein the electrode couples to a metal insert that is at least partially disposed within said fin, and wherein the metal insert provides signals between the electrode and an electromagnetic tool; wherein the electrode couples to said metal insert by way of a cantilever beam spring; wherein the cantilever beam spring couples to the metal insert by way of a conductive fastener; wherein the stabilizer apparatus comprises second and third fins extending radially from the elongate member, and wherein said fin, said second fin and said third fin center the elongate member within the drill string; wherein the fin comprises rubber and a cantilever beam spring, and wherein both the rubber and the cantilever beam spring provide contact force to the electrode to facilitate contact between said electrode and an inner diameter of the drill string; wherein said contact force is sufficient to inhibit exposure of the electrode to fluid within the drill string; wherein said angled leading face is angled to facilitate fluid flow past the angled leading face.

At least some of the embodiments in the present disclosure are directed to a system for providing electromagnetic signals, comprising: a drill string having multiple conductive members that couple to a gap sub to form an antenna; an electromagnetic tool disposed within the drill string; and a stabilizer disposed within the drill string and coupled to the electromagnetic tool, the stabilizer comprising an elongate member and a fin extending radially from the elongate member, said fin having an angled leading face and an electrode face, an electrode on the electrode face electrically coupling to one of said multiple conductive members to facilitate communication between the antenna and the electromagnetic tool. Such embodiments may be supplemented in a variety of ways, including by adding any or all of the following concepts, in any sequence and in any combination: wherein the stabilizer comprises additional fins, and wherein the fin and the additional fins contact an inner diameter of the drill string to resist movement with respect to the drill string; further comprising a fishing neck coupled to the stabilizer; wherein said angled leading face is positioned closer to the fishing neck than to the electromagnetic tool; wherein the angled leading face facilitates fluid flow through the drill string; wherein the fin further comprises a conductive fastener that couples to the electrode via a conductive cantilever beam spring, and wherein the conductive fastener further couples to the electromagnetic tool via a metal insert that is at least partially disposed within said fin.

At least some of the embodiments in the present disclosure are directed to a method for providing electromagnetic signals, comprising: positioning a stabilizer within a drill string such that an electrode disposed on a fin of the stabilizer electrically couples to one of multiple conductive members of the drill string that are separated by a gap sub; and providing a signal between an electromagnetic tool coupled to the electrode and said one of the multiple conductive members. Such embodiments may be supplemented in a variety of ways, including by adding any or all of the following concepts, in any sequence and in any combination: further comprising removing the stabilizer and the electromagnetic tool from the drill string using a fishing neck coupled to the stabilizer; wherein the fin comprises an angled leading face, and wherein an angle of the angled leading face facilitates fluid flow through the drill string; further comprising using a rubber material within said fin such that the rubber material and a spring provide contact force to the electrode sufficient to inhibit exposure of the electrode to fluid within the drill string.

The following is claimed:

1. A stabilizer apparatus for applying an electrical signal to a drill string antenna, comprising:
   an elongate member; and
   a fin extending radially from the elongate member, said fin having a leading face and an electrode face that opposes the elongate member, the electrode face including a radially deployable electrode to apply electrical signals to a conductive member of the drill string antenna.

2. The apparatus of claim 1, wherein the electrode couples to a metal insert that is at least partially disposed within said fin, and wherein the metal insert provides signals between the electrode and an electromagnetic tool.

3. The apparatus of claim 2, wherein the electrode couples to said metal insert by way of a cantilever beam spring.

4. The apparatus of claim 3, wherein the cantilever beam spring couples to the metal insert by way of a conductive fastener.

5. The apparatus of claim 1, wherein the stabilizer apparatus comprises second and third fins extending radially from the elongate member, and wherein said fin, said second fin and said third fin center the elongate member within the drill string.

6. The apparatus of claim 1, wherein the fin comprises rubber and a cantilever beam spring, and wherein both the rubber and the cantilever beam spring provide contact force to the electrode to facilitate contact between said electrode and an inner diameter of the drill string.

7. The apparatus of claim 6, wherein said contact force is sufficient to inhibit exposure of the electrode to fluid within the drill string.

8. The apparatus of claim 1, wherein said leading face is angled to facilitate fluid flow past the angled leading face.

9. The apparatus of claim 1, wherein the stabilizer apparatus comprises rubber.

10. The apparatus of claim 1, wherein the drill string antenna is a dipole antenna comprising multiple conductive members of a drill string separated by an insulating gap sub, and wherein the electrode applies said electrical signals to one of said multiple conductive members.

11. A system for providing electromagnetic signals, comprising:
    a drill string having multiple conductive members that couple to a gap sub to form an antenna;
    an electromagnetic tool disposed within the drill string; and
    a stabilizer disposed within the drill string and coupled to the electromagnetic tool, the stabilizer comprising an elongate member and a fin extending radially from the elongate member, said fin having a leading face and an electrode face, a radially deployable electrode on the electrode face electrically coupling to one of said multiple conductive members to facilitate communication between the antenna and the electromagnetic tool.

12. The system of claim 11, further comprising a fishing neck coupled to the stabilizer.

13. The system of claim 12, wherein the leading face is positioned closer to the fishing neck than to the electromagnetic tool.

14. The system of claim 13, wherein the leading face is angled to facilitate fluid flow through the drill string.

15. The system of claim 11, wherein the fin further comprises a conductive fastener that couples to the electrode via a conductive cantilever beam spring, and wherein the conductive fastener further couples to the electromagnetic tool via a metal insert that is at least partially disposed within said fin.

16. The system of claim 11, wherein the stabilizer comprises additional fins, and wherein the fin and the additional fins contact an inner diameter of the drill string to resist movement with respect to the drill string.

17. A method for providing electromagnetic signals, comprising:
    positioning a stabilizer within a drill string such that a radially disposable electrode disposed on a fin of the stabilizer electrically couples to one of multiple conductive members of the drill string that are separated by a gap sub; and
    providing a signal between an electromagnetic tool coupled to the electrode and said one of the multiple conductive members.

18. The method of claim 17, wherein the fin comprises an angled leading face, and wherein an angle of the angled leading face facilitates fluid flow through the drill string.

19. The method of claim 17, further comprising using a rubber material within said fin such that the rubber material and a spring provide contact force to the electrode sufficient to inhibit exposure of the electrode to fluid within the drill string.

20. The method of claim 17, further comprising removing the stabilizer and the electromagnetic tool from the drill string using a fishing neck coupled to the stabilizer.

* * * * *